United States Patent
de Paoli et al.

(10) Patent No.: US 8,066,934 B2
(45) Date of Patent: Nov. 29, 2011

(54) PROCESS OF CONFECTION OF POLYAMIDE COMPOUNDS WITH NATURAL FIBERS AND COMPOUNDS OF POLYAMIDES WITH NATURAL FIBERS

(75) Inventors: Marco Aurélio de Paoli, Campinas (BR); Karen Kely Godoi Fermoselli, Campinas (BR); Márcia Aparecida da Silva Spinacé, Campinas (BR); Paulo Aparecido dos Santos, Vinhedo (BR); João Carlos Girioli, Campinas (BR)

(73) Assignees: Sabic Innovative Plastics South America (BR); Universidade Estadual de Campinas (BR)

( * ) Notice: Subject to any disclaimer, the term of this patent is extended or adjusted under 35 U.S.C. 154(b) by 227 days.

(21) Appl. No.: 12/302,135

(22) PCT Filed: May 24, 2007

(86) PCT No.: PCT/BR2007/000122
§ 371 (c)(1),
(2), (4) Date: May 8, 2009

(87) PCT Pub. No.: WO2007/137378
PCT Pub. Date: Dec. 6, 2007

(65) Prior Publication Data
US 2009/0234047 A1    Sep. 17, 2009

(30) Foreign Application Priority Data
May 25, 2006    (BR) ...................................... 0602097

(51) Int. Cl.
*D01D 5/08*     (2006.01)
*D01F 1/10*     (2006.01)
*D01F 6/60*     (2006.01)
*D06M 10/02*    (2006.01)
*H05B 7/00*     (2006.01)

(52) U.S. Cl. ... 264/469; 264/140; 264/211; 264/211.23; 264/232; 264/234; 264/483

(58) Field of Classification Search ................. 264/140, 264/211, 211.23, 232, 234, 469, 483
See application file for complete search history.

(56) References Cited

U.S. PATENT DOCUMENTS
2009/0118398 A1* 5/2009 Nascimento et al. .......... 524/27

FOREIGN PATENT DOCUMENTS
FR    2 781 492    1/2000

OTHER PUBLICATIONS

Herman Winata, et al.; *Applications of Polyamide/Cellulose Fiber/Wollastonite Composites for Microcellular Injection Molding*; ANTEC; 2003; pp. 701-705 (XP-002471423).
Alexandre Gomes, et al.; *Effects of Alkali Treatment to Reinforcement on Tensile Properties of Curaua Fiber Green Composites*; JSME International Journal; 2004; pp. 541-546; Series A, vol. 47, No. 4 (XP-002471424).
Johan Felix, et al.; *Plasma Modification of Cellulose Fibers: Effects on Some Polymer Composite Properties*; Journal of Applies Polymer Science; 1994; pp. 285-295; vol. 51 (XP-002471425).
Prof. Dr. Ryszard Kozlowski; *Potential and Diversified Uses of Green Fibres*; $3^{rd}$ International Wood and Natural Fibre Composites Symposium; Sep. 19-20, 2000; pp. 2-1-2-14; Kassel, Germany (XP-002471426).
International Search Report and Written Opinion of the International Searching Authority for International Application No. PCT/BR2007/000122, (dated Mar. 4, 2008).

* cited by examiner

*Primary Examiner* — Leo B Tentoni
(74) *Attorney, Agent, or Firm* — Cantor Colburn LLP

(57) ABSTRACT

The present invention relates to a process of production of polyamide compounds with natural fibers and polyamide compounds with natural fibers, establishes the fact of using natural fiber to obtain a compound with mechanical properties close to the one obtained with inorganic loads by means of continuous process with extrusion and molding by injection process; the processes presented allows the obtainment, by means of injection, of finished products with precise dimensional and complex features; the fact that the compound with natural Curauá fiber presenting suitable mechanical properties combined to a lesser density than the compound with inorganic load is interesting to the automotive industry as vehicles manufactured with lighter parts consume less fuel.

20 Claims, 1 Drawing Sheet

PROCESS OF CONFECTION OF POLYAMIDE COMPOUNDS WITH NATURAL FIBERS AND COMPOUNDS OF POLYAMIDES WITH NATURAL FIBERS

The present Patent Invention has the objective of obtainment, by means of extrusion/injection, a polyamide compound, such as polyamide-6, reinforced with natural fibers.

Therefore, one of the objectives of the present patent is to replace the fibers of inorganic materials, such as, for example, fiberglass, with fibers from organic materials, such as, for example, Curauá fiber in polyamide compounds.

FUNDAMENTS OF THE INVENTION

The use of synthetic fibers as a reinforcement in polymers has been made by the industry in order to obtain materials with better mechanical performance. However, they have high abrasive power, resulting in wear in equipment used for the processing, in addition to the fact that they are not degradable by exposure to the environment.

There is a growing interest in the use of natural fibers as reinforcement in compounds with thermoplastic matrixes [M. Palabiyik, S. Bahadur. *Wear*, 253 (2002) 369-376.], [J. J. Rajesh, J. Bijwe, U. S. Tewari. *Journal of Materials Science* 36 (2001) 351-356.], [S.-H. Wu, F.-Y. Wang, C.-C. M. Ma, W.-C. Chang, C.-T, Kuo, H.-C. Kuan, W.-J. Chen. *Materials Letters* 49 (2001) 327-333.], [A. G. Pedroso, L. H. I. Mei, J. A. M. Agnelli, D. S. Rosa. *Polymer Testing*, 18 (1999) 211-215.], [A. G. Pedroso, L. H. I. Mei, J. A. M. Agnelli, D. S. Rosa. *Polymer Testing*, 21 (2002) 229-232.], [S. V. Joshi, L. T. Drzal, A. K. Mohanty, S. Arora.], [M. A. Silva Spinacé, K. K. G. Fermoselli, M.-A. De Paoli, *PPS* 2004 *Americas Regional Meeting*, 2004 *Proceedings*, Florianópolis, S. C., Brazil, 48-49.] and [A. L., Leão R. Rowell, N. Tavares, *Sci. Technol. Polym. Adv. Mater*, (1998) 756.].

This interest is due to its low cost and some advantages such as: they are atoxic, obtained from renewable sources, are recyclable, biodegradable, have low density, good mechanical properties and low attrition on processing equipment when compared to inorganic fibers. In addition, the production of inorganic fibers, such as fiberglass for instance, requires large amounts of power, increasing its impact on the environment. However, the hydrophilic nature of natural fibers influences in the properties of adhesion due to the weak interfacial interactions between the fiber and the polymeric matrix, affecting the mechanical properties of the compound. A way of improving the adhesion of the fiber with the polymeric matrix is by means of modification of the fiber surface by physical and or chemical methods, or by using coupling agents. Currently, different natural fibers have been studied for the obtainment of these compounds. Among them stands out the fiber extracted from plants belonging to the family of the bromeliaceous, which are found in the Amazon region. These species do not require soils of high fertility and can be planted in sandy texture soils, but with a high level of organic matter.

An example of this type of plant is the Curauá (*Ananás erectofolius* of the species L. B. Smith), which was considered as the ideal substitute of fiberglass for some applications, as it presents a lesser density, cost and abrasiveness on the processing equipment, when compared with fiberglass.

BRIEF DESCRIPTION OF THE INVENTION

Based on the state of the art, and aimed at optimizing it, the present patent of Invention was developed.

The present invention establishes the fact of using a natural fiber to obtain a compound with mechanical properties similar to the one obtained from inorganic loads by means of a continuous process such as extrusion and molding by injection process.

The process treated herein allows the obtainment, by means of injection, of finished products with precise and complex dimensional features.

The natural fiber of preference is the natural fiber of Curauá, which presents properties similar to that of fiberglass.

The fact of the compound with the natural fiber of Curauá presenting suitable mechanical properties combined with a lesser density than the compound with inorganic load is interesting to the automotive industry as manufactured vehicles with lighter parts consume less fuel.

The compound in question can also be employed in the civil construction industry.

BRIEF DESCRIPTION OF THE FIGURES

The preset patent of invention shall be described in detail based on the figures listed below, namely.

DETAILED DESCRIPTION OF THE INVENTION

Figure 1A:
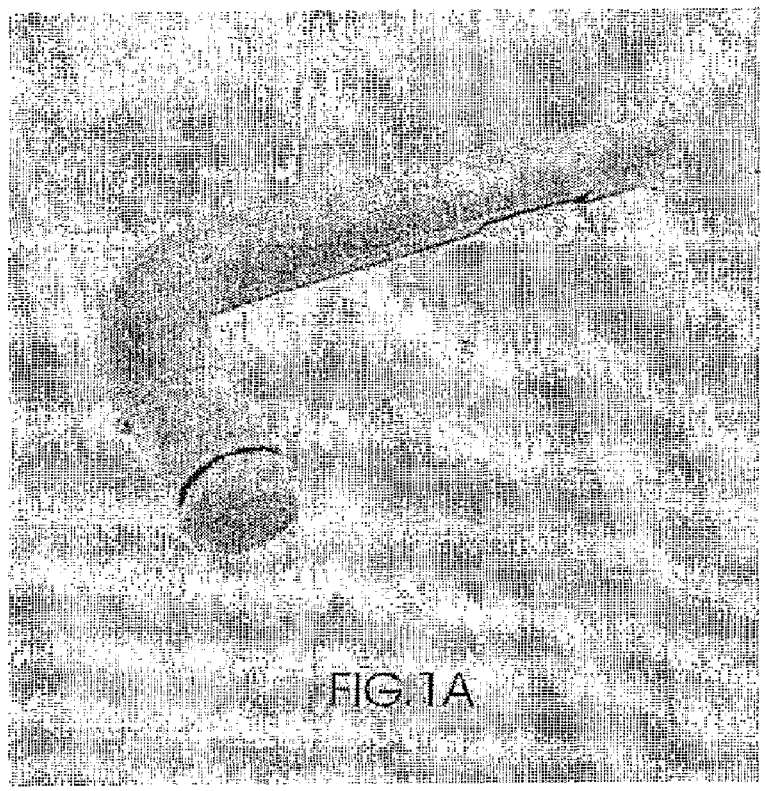
FIGS. 1A and 1B illustrate an example of finished product, such product being a part of the automobile industry, molded by injection using the compound of polyamides with natural fibers treated herein. The aspect and finishing of the part and its performance demonstrate that it is possible to manufacture a finished product by injection molding using natural fiber as reinforcement.

As described above, the present patent invention presents two objectives, namely the process of production of the polyamide compounds with natural fibers and the genuine polyamide compounds with natural fibers.

The production process of the compounds of polyamides with natural fibers

For the confection of the polyamide compounds, preferably polyamide-6, with natural fibers, preferably the fiber of Curauá, it is (A) employed: Natural fibers in bulk form, i.e. without washing, drying and superficial treatment; and (B) Dry natural fibers for 1.5 hours at 100° C. in a conventional kiln without superficial treatment.

The process of confection of polyamide compounds with natural fibers involves the following stages:

1) Preparation of natural fibers. This stage establishes the following sub-stages:
   1.1) The natural fibers, in the forms of A or B, are ground in a cutting (knives) mill until obtainment of mean length between 0.1 to 15 mm;
   1.2) The natural fibers, already ground, are superficially treated with cold plasma of $O_2$ or $N_2$, in a quartz reactor;
   1.3) The fibers are treated between an interval of 30 minutes up to 2 hours in a solution of 10% in mass of NaOH (solution with pH approximately equal to 5.0), washed once with water from main water supply, and once with distilled water (w/pH value about equal to 6.0); and
   1.4) Subsequently, the fibers are dried in a kiln at 100° C. for 2 hours.
2. Confection of polyamide compounds with natural fibers. This stage establishes the following sub-stages:
   2.1) Separate the quantity of natural fibers to be used;

2.2 Homogenize the natural fibers prepared beforehand with the polymeric matrixes; and extrude the compound obtained in sub-stage 2.2.

It is important to mention that the quantity of fibers used is from 10 to 50% in ground fiber mass in relation to the mass of the polymeric matrixes used.

The treatment method of natural fiber that produces the compound with better performance is the treatment with oxygen plasma.

The polymeric matrixes used are: polyamide-6 without any modification and or polyamide-6 containing about 1 to 10% in poly(ethylene-co-propylene-co-diene) elastomer mass functionalized with anhydrous maleic (EPDM-g-AM).

The extrusion of the compound obtained in the sub-stage 2.2 should occur in extrusion equipment of single-worm thread type (L/D=30, D=32 mm), double-worm thread (L/D=13, D=29 mm, co-rotatory, interpenetrating, worm thread with segmented shape), using rotation between 50 to 300 rpm, and temperature profile between 200 and 250° C.

After the extrusion the compound are picked off and molded by injection using temperature profile between 200 and 260° C.

The polyamide compounds with natural fibers.

The compounds obtained from the process detailed above, for the purpose of testing, injected, and from such injection obtained the trial bodies.

The obtained trial bodies were used in traction, flexion, shock, thermal distortion temperature (HDT) and density essays.

The trial bodies were characterized using ASTM standards by means of traction trials (ASTM D 638-02), flexion (ASTM D 790-02), impact (ASTM D 256-02), HDT (ASTM D 648-98c) and density (ASTM D 792-00).

The results of the traction mechanical trials for the compounds revealed that the addition of natural fibers, treated or not, acts as reinforcement to polyamide-6, as the addition (20 wt %) promotes an increase of up to 300% in the module under traction and 80% in tension in maximum force.

The values of the mechanical properties and HDT described below refer to the 3 compounds with 80 wt % of polyamide-6 and 20 wt % of Curauá fiber, talc or fiberglass, respectively. The tension values at maximum force ($\sigma$max.) and the Young module under traction (E), obtained were 80 ($\pm$1), 73 ($\pm$1), 101 ($\pm$1) MPa; and 5.1 ($\pm$0.4), 6.7 ($\pm$0.6) and 6.5 ($\pm$0.5) GPa, respectively. The values of resistance to shock, such as Izod with indentation for three compounds described above were: 9 ($\pm$1), 9 ($\pm$2) and 7 ($\pm$1) J m$^{-1}$, respectively, and for shock resistance measures without indentation were of 35 ($\pm$2), 58 ($\pm$3) and 32 ($\pm$4) J m$^{-1}$, respectively. The values measured for tension at maximum force were: 116 ($\pm$2), 114 ($\pm$2), 160 ($\pm$5) MPa, respectively. The values measured for the Young model under flexion were: 3.7 ($\pm$0.1), 4.4 ($\pm$0.1), and 5.0 ($\pm$0.1) GPa, respectively. The HDT values using 1.82 MPa tension for these compounds were: 186 ($\pm$10), 110 ($\pm$4), and 194 ($\pm$1)° C., respectively; and using 0.45 MPa tension, were: 217 ($\pm$1), 206 ($\pm$4), and 214 ($\pm$1)° C., respectively. The densities obtained for these three compounds were: 1.18 ($\pm$0.01), 1.27 ($\pm$0.01) and 1.27 ($\pm$0.01) g cm$^{-3}$, respectively.

The treatment method of the Curauá fiber, which produces the compound with the best performance is the treatment with oxygen plasma. However, the compound prepared with the Curauá fiber without treatment and polyamide-6 without pre-drying presents performance comparable to that of polyamide-6 loaded with talc. For the compounds prepared with treated Curauá fiber, the performance results are above the one of the respective compounds using talc as load and the specific mechanical properties are comparable to the one of compounds containing fiber glass. Both the values of resistance to shock and to HDT are similar to the compounds containing fiberglass.

The sweep optical and electronic micrographies showed a good distribution, dispersion and adhesion of the fiber matrix.

The analysis of the intrinsic viscosity of the polyamide-6, of polyamide-6 with stabilizing additives, and without fibers processed and injected, and of the injected trial bodies of compounds with 20 wt % of Curauá fiber, were: $\eta$=96.59 ($\pm$0.23), $\eta$=98.02 ($\pm$0.66) and $\eta$=97.47 ($\pm$3.03) mL g-1, respectively. Therefore, it was verified that there is no matrix degradation of the polyamide-6 during the processing with or without Curauá fiber. To evaluate the finishing and appearance, a part was injected using a mold provided by a parts company, which is used for producing polyamide parts reinforced with fiberglass, as shown in FIGS. 1A and 1B.

Figure 1B:
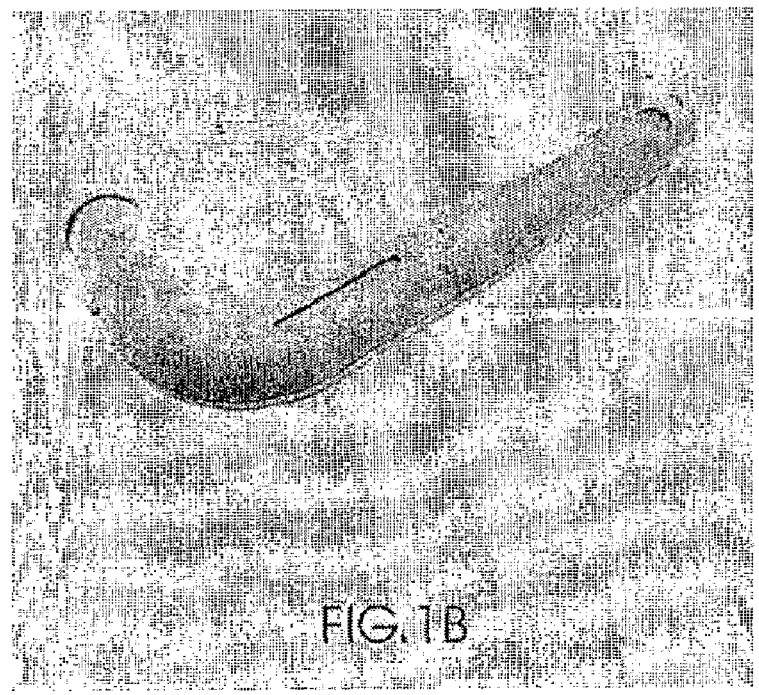

FIGS. 1A and 1B show the finished product molded by injection, using the raw material described in this technical report. The aspect and finishing of the parts reinforced with the Curauá fiber are superior to those of parts produced with polyamide-6, reinforced with fiberglass. The performance of the part in standard trials of the automobile industry reveals that it is possible to manufacture a finished product by injection molding using natural fibers as reinforcement. This fiber is a raw material of renewable and biodegradable source for application in the automobile, civil construction industry, etc. The description above of the present invention was presented with the purpose of illustrating and describing. In addition, the description is not intended to limit the invention to the manner by which its reveled herein. Consequently, variations and modifications compatible with the above teachings and the ability or knowledge of the relevant technique, are within the scope of the present invention.

The modalities described above are aimed at providing a better explanation of the known modes for the practice of the invention and allow the technicians of the area to use the invention in such, or other modalities, and with the modifications necessary by the specific applications, or uses of the present invention. It is the purpose of the present invention to include all of its modifications and variations within the scope described in the report.

The invention claimed is:

1. A process for the production of polyamide compounds with natural fibers characterized by using: (A) natural fibers in bulk form and (B) natural fibers dried for 1.5 hour at 100° C. in a conventional kiln without superficial treatment; the process including the following stages:
   (1) preparing of natural fibers and
   (2) producing polyamide compounds with natural fibers; wherein the stage (1) includes the following sub-stages:
      (1.1) grinding of natural fibers in the form A and form B, until obtaining a mean length of about 0.1 to 15 mm;
      (1.2) superficially treating the natural fibers of stage 1.1 with cold plasma of $O_2$ or $N_2$ in a quartz reactor;
      (1.3) treating the fibers of stage 1.2 in a solution of 10% in NaOH mass, washed once in water from a main water supply, and once with distilled water; and
      (1.4) drying the fibers of stage 1.3 in a kiln at 100° C. for 2 hours; wherein stage (2) establishes the following sub-stages:
      (2.1) separating the amount of natural fibers to be used;
      (2.2) homogenizing the natural fibers prepared in advance with the polymeric matrixes of said polyamide compounds to obtain a compound; and
      (2.3) extruding the compound obtained in sub-stage (2.2).

2. A process according to claim 1, wherein the quartz reactor of sub-stage (1.2) has an RF source of 13.56 MHz, power of 30 W, and pressure of 4×10⁻² Torr for 15 min; and wherein in sub-stage (1.3), the fibers are treated for a period of 30 minutes to 2 hours, and wherein the solution of 10% in NaOH mass has a pH of about 5.0 and the distilled water has a pH of about 6.

3. A process according to claim 1, characterized by the fact that the amount of fibers used is of 10 to 50% in ground fiber mass in relation to the mass of the polymeric matrixes used.

4. A process according to claim 1, characterized by the fact that the polyamide compounds are polyamide-6 and the natural fibers are Curaua fibers.

5. A process according to claim 4, characterized by the fact that the polyamide matrixes used are: polyamide-6 without any modification, and polyamide-6 containing about 1 to 10% in poly (ethyle-ne-co-propylene-co-diene) elastomer mass, functionalized with anhydrous maleic.

6. A process according to claim 1, characterized by the fact that the extrusion of the compound obtained in sub-stage (2.2) take place in extrusion equipment of single- or double-worm thread, using from 50 to 300 rpm and temperature profile of 200 to 250° C.

7. A process for the production of polyamide compounds with natural fibers characterized by using: (A) natural fibers in bulk form and (B) natural fibers dried for 1.5 hour at 100° C. in a conventional kiln without superficial treatment; the process including the following stages:
    (1) preparing of natural fibers and
    (2) producing polyamide compounds with natural fibers; wherein the stage (1) includes the following sub-stages:
    (1.1) grinding of natural fibers in the form A and form B until obtaining a mean length of about 0.1 to 15 mm;
    (1.2) superficially treating the natural fibers of stage 1.1, with cold plasma of $O_2$ or $N_2$ in a quartz reactor;
    (1.3) treating the fibers of stage 1.2 in a solution of 10% in NaOH mass; and
    (1.4) drying the fibers of stage 1.3 in a kiln at 100° C. for 2 hours;
    wherein stage (2) establishes the following sub-stages:
    (2.1) separating an amount of natural fibers from stage 1.4;
    (2.2) homogenizing the thus separated natural fibers prepared with a polyamide polymeric matrix to obtain a compound that is a blend of natural fibers and the polyamide polymer matrix; and
    (2.3) extruding the compound obtained in sub-stage (2.2).

8. The process of claim 7, wherein the polyamide polymer matrix is selected from the group consisting of polyamide-6 without any modification, and polyamide-6 containing about 1 to 10% in poly (ethyle-ne-co-propylene-co-diene) elastomer mass, functionalized with anhydrous maleic.

9. The process of claim 7, wherein the compound of stage 2.2. comprises 80 wt % of polyamide-6 and 20 wt % of Curauá fiber, and wherein the compound has a density of about 1.16 g cm³.

10. The process of claim 7, wherein the amount of natural fibers used is of 10 to 50% in ground fiber mass in relation to the mass of the polyamide polymeric matrix used.

11. The process of claim 7, further comprising the step of washing the fibers treated with NaOH mass with distilled water.

12. A process for the production of polyamide compounds with natural fibers comprising:
    grinding of Curaua fibers to have a mean length of about 0.1 to 15 mm;
    treating the ground fibers with cold plasma of $O_2$ or $N_2$;
    treating the fibers treated with cold plasma in a solution of NaOH mass;
    drying the fibers treated with NaOH mass;
    homogenizing the fibers with a polyamide polymeric matrix;
    extruding the homogenized fibers and polyamide polymeric matrix.

13. The process of claim 12, wherein the polyamide polymeric matrix comprises polyamide-6.

14. The process of claim 12, further comprising the step of washing the fibers treated with NaOH mass with distilled water.

15. The process of claim 12, wherein the fibers are dried in a kiln at 100° C. for 2 hours.

16. The process of claim 12, wherein the extruded homogenized fibers and polyamide polymeric matrix comprises 80 wt % of polyamide-6 and 20 wt % of Curauá fiber.

17. The process of claim 12, wherein the polyamide polymer matrix contains 1 to 10% of poly (ethylene-co-propylene-co-diene).

18. The process of claim 12, wherein the solution of NaOH mass is a solution of 10% in NaOH mass.

19. The process of claim 12, wherein the Curaua fibers comprise (A) Curaua fibers in bulk form and (B) Curaua fibers dried for without superficial treatment.

20. A process for the production of polyamide compounds with natural fibers characterized by using: (A) natural fibers in bulk form and (B) natural fibers dried without superficial treatment; the process including the following stages:
    (1) preparing of natural fibers including
        (1.1) grinding of natural fibers in the form A and form B, until obtaining a mean length of about 0.1 to 15 mm;
        (1.2) superficially treating the natural fibers of stage 1.1 with cold plasma of $O_2$ or $N_2$;
        (1.3) treating the fibers of stage 1.2 in a solution of NaOH; and
        (1.4) drying the fibers of stage 1.3; wherein stage (2) establishes the following sub-stages:
    (2) producing polyamide compounds with natural fibers, including
        (2.1) separating the amount of natural fibers to be used;
        (2.2) homogenizing the natural fibers prepared in advance with the polymeric matrixes of said polyamide compounds to obtain a compound; and
        (2.3) extruding the compound obtained in sub-stage (2.2).

* * * * *